(12) United States Patent
Fujioka et al.

(10) Patent No.: US 8,286,528 B2
(45) Date of Patent: Oct. 16, 2012

(54) ROBOT ARM

(75) Inventors: Soichiro Fujioka, Osaka (JP); Osamu Mizuno, Osaka (JP); Yoshihiko Matsukawa, Nara (JP); Akinobu Okuda, Osaka (JP); Tsuyoshi Tojo, Osaka (JP); Rie Takahashi, Osaka (JP); Tohru Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 94 days.

(21) Appl. No.: 12/863,644

(22) PCT Filed: Jan. 21, 2009

(86) PCT No.: PCT/JP2009/000217
§ 371 (c)(1),
(2), (4) Date: Jul. 20, 2010

(87) PCT Pub. No.: WO2009/093451
PCT Pub. Date: Jul. 30, 2009

(65) Prior Publication Data
US 2011/0036188 A1    Feb. 17, 2011

(30) Foreign Application Priority Data

Jan. 22, 2008  (JP) ................................. 2008-011247

(51) Int. Cl.
*B25J 17/00* (2006.01)
*B25J 17/02* (2006.01)
*B25J 18/00* (2006.01)
(52) U.S. Cl. ..................... 74/490.05; 74/490.01; 901/25
(58) Field of Classification Search ............... 74/490.01, 74/490.03, 490.05, 490.06, 404, 406, 411.5; 901/25, 46, 49, 567; 318/567; 475/305
See application file for complete search history.

(56) References Cited

U.S. PATENT DOCUMENTS 78,645 A * 6/1868 Clarke .......................... 475/305
(Continued)

FOREIGN PATENT DOCUMENTS
JP    6-278081    10/1994
(Continued)

OTHER PUBLICATIONS

International Search Report issued Feb. 17, 2009 in International (PCT) Application No. PCT/JP2009/000217.

*Primary Examiner* — Justin Krause
(74) *Attorney, Agent, or Firm* — Wenderoth, Lind & Ponack, L.L.P.

(57) ABSTRACT

A robot arm has a drive gear that has a shaft, a gear frame being capable of turning about the shaft of the drive gear, a first follower gear being capable of turning, in synchronization with the drive gear, about a shaft fixed to the gear frame, in a direction opposite to the turning direction of the drive gear, a transmission control mechanism that is capable of locking the first follower gear to the drive gear, an arm that moves in synchronization with the first follower gear, and a collision detection unit that is capable of detecting a collision between the arm and an obstacle. The transmission control mechanism unlocks the follower gear from the drive gear in response to detection, by the collision detection unit, of a collision between the arm and the obstacle. The robot arm enables quick cushioning of the impact force of the collision.

5 Claims, 8 Drawing Sheets

U.S. PATENT DOCUMENTS

| | | | |
|---|---|---|---|
| 681,511 A * | 8/1901 | Robinson | 475/305 |
| 2,899,477 A * | 8/1959 | Cartoux | 373/99 |
| 4,264,266 A * | 4/1981 | Trechsel | 414/730 |
| 4,661,797 A * | 4/1987 | Schmall | 340/561 |
| 4,666,361 A * | 5/1987 | Kitabatake et al. | 414/680 |
| 4,769,583 A * | 9/1988 | Goor | 318/568.18 |
| 4,813,732 A * | 3/1989 | Klem | 294/103.1 |
| 4,857,912 A * | 8/1989 | Everett et al. | 340/508 |
| 4,922,755 A * | 5/1990 | Oshiro et al. | 74/490.03 |
| 5,064,337 A * | 11/1991 | Asakawa et al. | 414/639 |
| 5,744,728 A * | 4/1998 | Suita et al. | 73/862.542 |
| 6,186,023 B1 * | 2/2001 | Nakamura et al. | 74/490.01 |
| 6,435,794 B1 * | 8/2002 | Springer | 414/5 |
| 6,732,015 B2 * | 5/2004 | Maeda | 700/245 |
| 6,978,959 B2 * | 12/2005 | Takasaka | 242/356 |
| 6,997,079 B2 * | 2/2006 | Nomura et al. | 74/440 |
| 7,102,315 B2 | 9/2006 | Nakata et al. | |
| 7,748,288 B2 * | 7/2010 | Chevalier et al. | 74/409 |
| 2004/0016315 A1 * | 1/2004 | Nakamura et al. | 74/490.05 |
| 2006/0071625 A1 | 4/2006 | Nakata et al. | |
| 2009/0200090 A1 * | 8/2009 | Takanishi et al. | 180/8.6 |
| 2010/0318224 A1 * | 12/2010 | Okuda et al. | 700/255 |
| 2012/0022689 A1 * | 1/2012 | Kapoor | 700/255 |
| 2012/0024091 A1 * | 2/2012 | Kawabuchi et al. | 74/37 |

FOREIGN PATENT DOCUMENTS

| | | |
|---|---|---|
| JP | 2002-66978 | 3/2002 |
| JP | 2005-59171 | 3/2005 |
| JP | 2006-43792 | 2/2006 |
| JP | 2006-346764 | 12/2006 |
| WO | 2005/009692 | 2/2005 |

* cited by examiner

ROBOT ARM

BACKGROUND OF THE INVENTION

I. Technical Field

The present invention relates to a robot arm in which the influence of collisions against personnel or obstacles can be mitigated.

II. Description of the Related Art

Various conventional technologies have been proposed for cushioning impact forces derived from collision with an obstacle or from collision avoidance.

For instance, Japanese Patent Application Laid-open No. 2005-59171 discloses a technology wherein, after detection of a collision between a robot arm and an obstacle, the direction of current flowing in a motor that drives a joint that couples an arm with an arm is reversed, to apply thereby, to the arm, torque that is the reverse of torque before the collision.

When reverse torque is applied to a conventional robot arm, through inversion of the current flowing through a motor, the robot arm slows down, stops and then reverses. This gives rise to a commensurate delay in the motion whereby the robot arm moves in a collision avoidance direction or in a withdrawing direction in which the impact force of the collision is mitigated. Ordinarily, the motor output of conventional robots has a built-in reducer for generating driving torque. Accordingly, the motor runs at comparatively high revolutions during operation of the robot arm, and hence the time elapsed from motor slowdown to reverse is apt to be substantial. That is, conventional robot arms are problematic in that the time elapsed until robot arm reversal is long, and in that the responsiveness of the reversing action for collision avoidance and/or for impact force cushioning is insufficient.

SUMMARY OF THE INVENTION

It is an object of the present invention to provide a robot arm that allows mitigating the influence of a collision.

According to one aspect of the present invention, a robot arm has: a drive gear that has a shaft; a gear frame that can turn about the shaft of the drive gear; a first follower gear that can turn, in synchronization with the drive gear, about a shaft fixed to the gear frame, in a direction opposite to the turning direction of the drive gear; a transmission control mechanism that is capable of locking the first follower gear relative to the drive gear; an arm that moves in synchronization with the first follower gear; and a collision detection unit that is capable of detecting a collision between the arm and an obstacle, wherein the transmission control mechanism unlocks the first follower gear from the drive gear in response to the detection, by the collision detection unit, of collision between the arm and the obstacle.

DETAILED DESCRIPTION OF THE INVENTION

Embodiments for carrying out the present invention are explained in detail below with reference to accompanying drawings.

Embodiment 1

Figure 1:
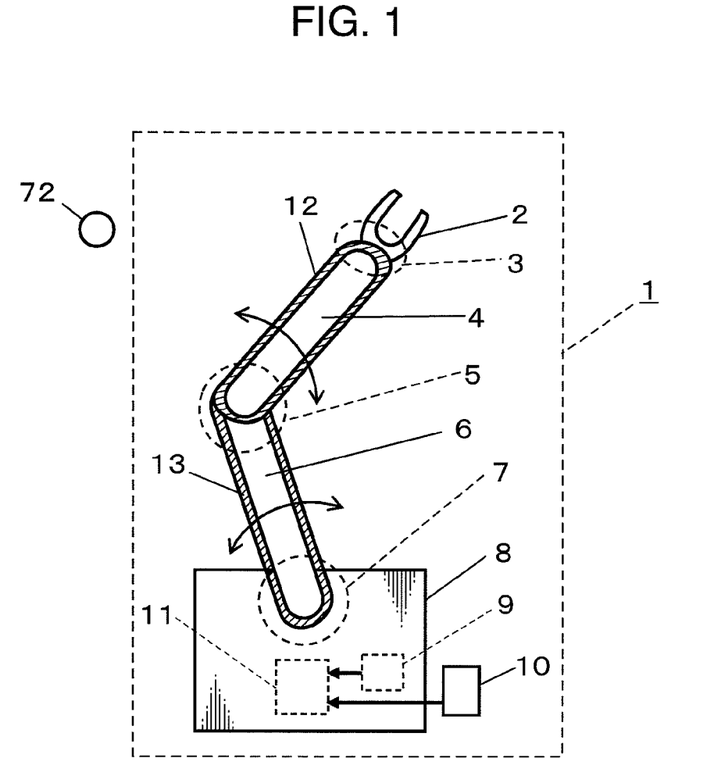
FIG. 1 is a schematic diagram illustrating the configuration of a robot arm in Embodiment 1 of the present invention.

The configuration of a robot arm according to Embodiment 1 of the present invention will be explained first with reference to FIG. 1. FIG. 1 is a schematic diagram illustrating the configuration of a robot arm 1 in Embodiment 1 of the present invention.

The robot arm 1 is an articulated robot arm in which a plurality of arms are coupled to each other, and, as shown in FIG. 1, comprises, for instance, a hand 2 for gripping an object, arms 4, 6, an arm base 8, and joints 3, 5, 7.

The hand 2 and the arm 4 are coupled by way of the joint 3. The arm 4 and the arm 6 are coupled by way of the joint 5. The arm 6 and the arm base 8 are coupled by way of the joint 7.

The robot arm 1 further comprises a collision detection unit 9 for detecting collision with an obstacle 72 such as a person or a mobile or stationary object; an input unit 10; and a control unit 11 for controlling the operation of the joints 3, 5 and the joint 7 on the basis of an operation command from the input unit 10 and a detection output from the collision detection unit 9.

Figure 4:
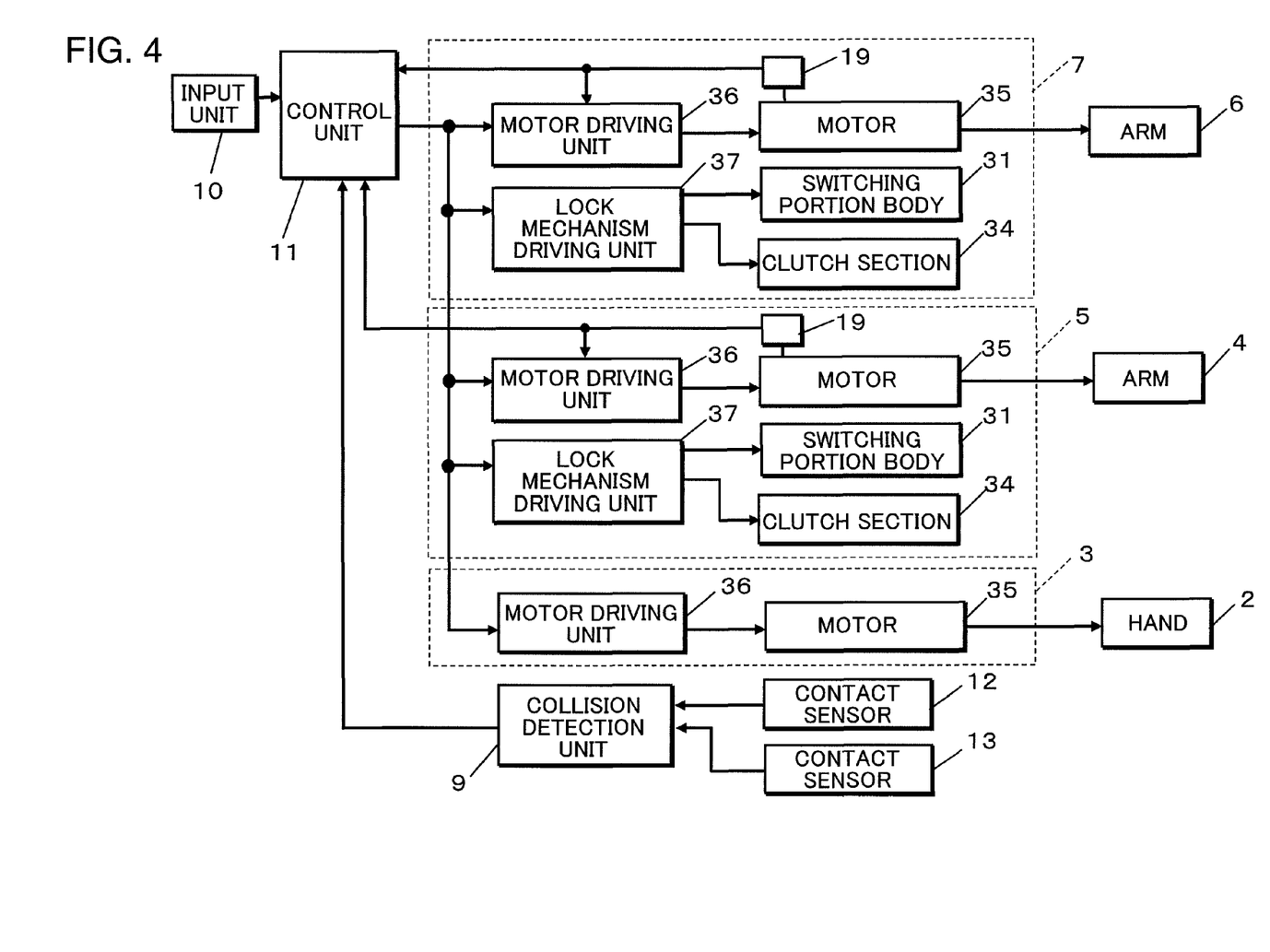
FIG. 4 is a block diagram illustrating the electric configuration of the robot arm.

In the robot arm 1, the attitude and position of the hand 2 and the arms 4, 6 can be changed through driving of a motor 35 provided in each joint 3, 5, 7, in accordance with an operation command from the input unit 10 (FIG. 4). As described below, the arm 4 and/or the arm 6 of the robot arm 1 can be withdrawn in such a way so as to move away from the obstacle 72 when the collision detection unit 9 detects a collision between the arm 4, 6 and the obstacle 72. The hand 2, which comprises a conventional actuator, can grip an object.

The joint 3, which comprises a known driving motor 35, can cause the hand 2 to turn. The joint 5 couples the arm 4 and the arm 6 turnably to each other, and comprises a known driving motor 35. The arm 4 can thus turn on the arm 6 through driving of the motor 35 that is provided in the joint 5. The attitude of the arm 4 with respect to the arm 6 can be modified as a result. Likewise, the joint 7 couples the arm 6 turnably on the arm base 8. The arm 6 is caused to turn on the arm base 8 through driving of the motor 35.

A contact sensor 12 for detecting contact with the obstacle 72 is provided on the surface of the arm 4. Likewise, a contact sensor 13 for detecting contact with the obstacle 72 is provided on the surface of the arm 6.

The contact sensors 12, 13 detect contact with the obstacle 72 for instance on the basis of resistance changes at the intersections of a criss-cross pattern that is printed using a conductive pressure-sensitive ink. A sheet having a pattern of such a conductive pressure-sensitive ink is provided on the inner side, and is covered with an outer coating, with a spacer in between. Upon contact of the outer coating against the obstacle 72, the inner sheet is pushed in, via the spacer, and resistance changes, which brings the contact sensors 12, 13 into operation (hereafter, "turning on").

The collision detection unit 9 detects at which site collision against the obstacle 72 has taken place on the basis of the output from the contact sensors 12, 13 that detect contact with the obstacle 72, and outputs that information to the control unit 11. Specifically, the collision detection unit 9 can detect the collision site with the obstacle 72 on the basis of resistance changes at the intersections of the criss-cross patterns on the contact sensors 12, 13. When for instance the contact sensor 12 is switched on, the collision detection unit 9 senses that the arm 4 has collided against the obstacle 72, and detects the collision site. Similarly, when the contact sensor 13 is switched on, the collision detection unit 9 senses that the arm 6 has collided against the obstacle 72, and detects the collision site.

When neither arms 4, 6 are colliding against the obstacle 72, the contact sensors 12, 13 are inactive (hereafter "switched off"). The collision detection unit 9 outputs in this case no information to the control unit 11.

The input unit 10 inputs operation commands from various input devices or the like, and outputs the operation commands to the below-described control unit 11. As the input device there can be used, for instance, conventional key input, a joystick, a touch panel or the like. If the robot arm 1 is configured so as to be capable of autonomous movement, the input unit 10 receives operation commands from an external higher-level control unit (not shown), and inputs those operation commands.

The control unit 11 comprises a central processing unit (hereafter "CPU") that assesses data and executes computations in accordance with a program for executing various functions; a Read Only Memory (ROM), exclusively for reading, in which various programs and so forth are stored; and a rewritable Random Access Memory (RAM) in which data can be temporarily stored. Through execution of a program in accordance with information inputted from outside, the control unit 11 can control the operation of the joints 3, 5, 7 on the basis of the operation commands inputted through the input unit 10 and on the basis of the detection output of the collision detection unit 9.

When the collision detection unit 9 detects a collision, the control unit 11 withdraws the arm 4 or arm 6 so that the latter moves away from the obstacle 72. For instance, when the collision detection unit 9 detects that the contact sensor 12 is switched on, the control unit 11 controls the joint 5 so that the arm 4 moves away from the obstacle 72. That is, the joint 5 is controlled in such a manner that the movement direction of the arm 4 is reversed. Similarly, when the collision detection unit 9 detects that the contact sensor 13 is switched on, the control unit 11 controls the joint 7 so that the arm 6 moves away from the obstacle 72. That is, the joint 7 is controlled in such a manner that the movement direction of the arm 6 is reversed.

The CPU of the control unit 11 receives the output from the collision detection unit 9 through a hardware interrupt, and executes a program for carrying out a withdrawal action. A fast response can be achieved as a result in case of collision. The withdrawing action upon collision detection is explained in detail further on.

Figure 2:
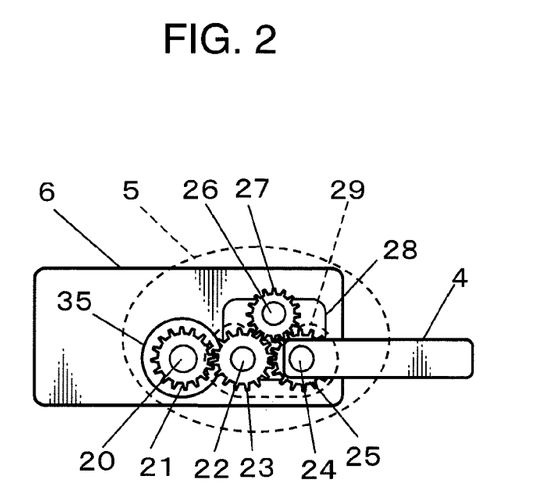
FIG. 2 is a schematic diagram illustrating the configuration of a joint in the robot arm.

The configuration of the joint 5 capable of withdrawing the arm 4 colliding against the obstacle 72 is explained next with reference to FIG. 2. FIG. 2 is a schematic diagram illustrating the configuration of the joint 5 of the robot arm 1 in Embodiment 1 of the present invention.

As illustrated in FIG. 2, the joint 5 couples the arm 4 and the arm 6. The joint 5 comprises a motor 35 and a reversing gear mechanism 29. The arm 4 is caused to turn, by way of the reversing gear mechanism 29, through driving of the motor 35 that is fixed to the arm 6.

The motor 35 drives a motor output gear 21, which is fixed to the leading end of a shaft 20 of the motor 35, to drive thereby the reversing gear mechanism 29. The reversing gear mechanism 29 transmits the driving force of the motor output gear 21 to the arm 4. As a result, the arm 4 can be caused to turn about a shaft 22, through turning of the shaft 20 of the motor 35. A reducer (not shown) is built into the motor 35, so that the shaft 20 of the motor 35 outputs an output that is been reduced by the reducer.

The reversing gear mechanism 29 comprises a gear frame 28 that can turn about the shaft 22 that is fixed to the arm (first member) 6 to which the motor is fixed; a drive gear 23 comprising an outer gear turnably provided on the shaft 22; and a follower gear (first follower gear) 25 comprising an outer gear turnably provided on a shaft 24 that is fixed to the gear frame 28. The gear frame 28 comprises, for instance, a plate having a through-hole, so that the shaft 22 runs through the through-hole of the gear frame 28. As a result, the gear frame 28 can turn about the shaft 22. The drive gear 23 is turnably mounted to the leading end of the shaft 22 that protrudes beyond the through-hole.

The drive gear 23 and the follower gear 25 are meshed with each other, and the drive gear 23 and the follower gear 25 constitute the reversing gear mechanism 29 that transmits a driving force in mutually different directions.

The follower gear 25 is integrally mounted to the arm (second member) 4. As a result, the arm 4 turns together with the follower gear 25 about the shaft 24, in response to turning of the follower gear 25.

Figure 3A:
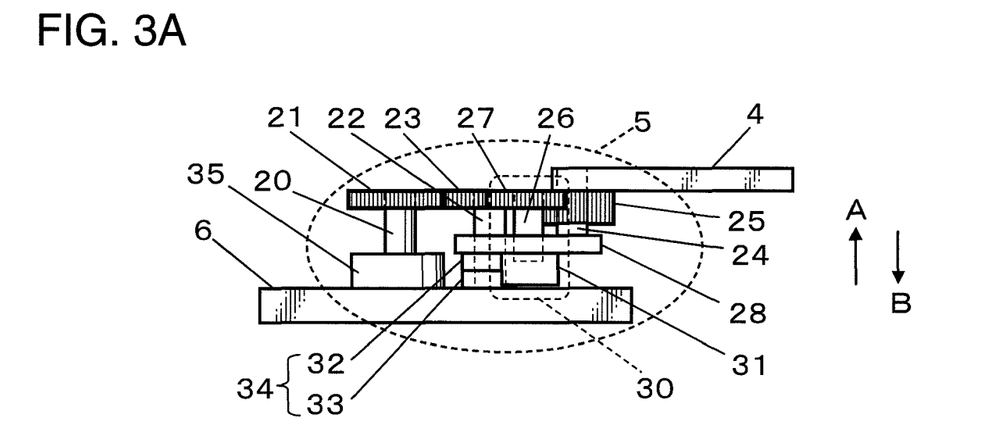
FIGS. 3A and 3B are schematic diagrams illustrating the configuration of a gear transmission control mechanism in the robot arm.
Figure 3B:
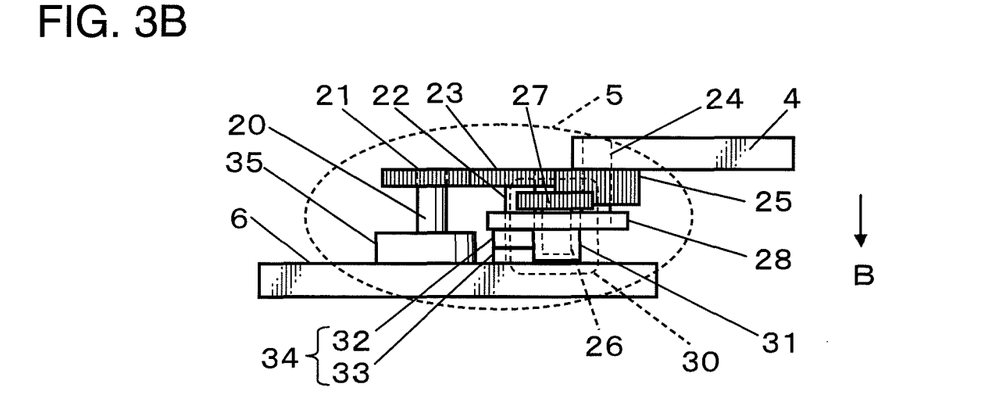

An explanation follows next, with reference to FIGS. 3A and 3B, on the operation of a transmission control mechanism 30 that locks or unlocks reverse-gear turning by the reversing gear mechanism 29.

FIGS. 3A and 3B are cross-sectional diagrams illustrating the configuration of the transmission control mechanism 30 of the robot arm 1 in the Embodiment 1 of the present invention. FIG. 3A is a cross-sectional diagram illustrating the configuration of the reversing gear mechanism 29 when reverse-gear turning thereof is locked, and FIG. 3B is a cross-sectional diagram illustrating the configuration of the reversing gear mechanism 29 when reverse-gear turning thereof is unlocked.

As illustrated in FIG. 3A and FIG. 3B, the robot arm 1 comprises the transmission control mechanism 30 for locking or unlocking the turning of the follower gear 25 relative to the drive gear 23 in the gear frame 28.

The transmission control mechanism 30 comprises a switching portion body 31 fixed to the gear frame 28 and having a built-in solenoid; a shaft (plunger) 26 that can move in an A direction or B direction relative to the switching portion body 31, through switching on or off of the switching portion body 31; and a follower gear (second follower gear) 27 provided on the leading end of the shaft 26. The follower gear 27 is turnably provided on the shaft 26.

The follower gear 27 moves in response to the advance or retreat of the shaft 26. Specifically, the follower gear can assume two positions, a lock position and an unlock position. The lock position is a position at which the follower gear 27 can mesh with both the drive gear 23 and the follower gear 25. The unlock position is a position at which the follower gear 27 meshes with the follower gear 25, but not with the drive gear 23.

To lock reverse-gear turning in the drive gear 23 and the follower gear 25, the transmission control mechanism 30 moves the shaft 26 in the A direction, as illustrated in FIG. 3A. As a result, the follower gear 27 moves to the lock position to mesh with both the drive gear 23 and the follower gear 25. Reverse-gear turning in the drive gear 23 and the follower gear 25 is locked thereby. The arm 4 turns then about the shaft 22 integrally with the gear frame 28, the follower gear 25 and the follower gear 27, in response to turning of the drive gear 23.

To unlock the drive gear 23 and the follower gear 25, the transmission control mechanism 30 moves the shaft 26 in the B direction, as illustrated in FIG. 3B. As a result, the follower gear 27 moves to the unlock position at which it unmeshes from the drive gear 23. At the unlock position, the follower gear 27 meshes with the follower gear 25 alone. At the unlock position, the drive gear 23 and the follower gear 25 are unlocked, and hence the follower gear 25 can turn with respect to the drive gear 23. The arm 4 is integrally mounted to the follower gear 25, and thereby turns about the shaft 24 in a direction opposite to the turning direction of the drive gear 23.

The follower gear 27 moves between the lock position and the unlock position while meshing with the follower gear 25. In the present embodiment, the drive gear 23 and the follower gear 27 comprise gears of substantially identical thickness, while the follower gear 25 comprises a gear sufficiently thicker than the drive gear 23 and the follower gear 27. The follower gear 27 is meshed with the follower gear 25 at all times as it moves reciprocally. In the transmission control mechanism 30, as a result, the turning of the follower gear 27 and the follower gear 25 is synchronized at all times, so that, when moved, the follower gear 27 meshes easily with the drive gear 23, which is synchronized with the follower gear 25.

The follower gear 27 may also be caused to move between the lock position and the unlock position while meshing with the drive gear 23, so that, when moved, the follower gear 27 meshes easily with the follower gear 25, which is synchronized with the drive gear 23. In this case, the drive gear 23 is thicker than the follower gears 25, 27.

The drive gear 23, the follower gear 25 and the follower gear 27 mesh with each other in such a manner that the teeth of one gear match the lands of the other gear, at the position at which the gears mesh with each other. The gears mesh with each other easily as a result.

The turning direction of the arm 4 can be changed thus without switching of the rotation direction of the motor 35, thanks to the transmission control mechanism 30 that causes the follower gear 27 to move to between the lock position and the unlock position. Specifically, when the follower gear 27 of the transmission control mechanism 30 is at the lock position, and reverse-gear turning by the reversing gear mechanism 29 is accordingly locked, the arm 4 can turn in the direction opposite to the rotation direction of the shaft 20 of the motor 35. When the follower gear 27 is brought to the unlock position and is unlocked, the arm 4 can turn in the same direction as the rotation direction of the shaft 20 of the motor 35.

A configuration is also possible in which the gear frame 28 is unlocked upon unlocking by the reversing gear mechanism 29. In the instance explained herein, however, turning of the gear frame 28 is locked during reverse-gear turning, through unlocking of the reversing gear mechanism 29.

As illustrated in FIG. 3B, the joint 5 comprises a clutch section 34 for locking the turning of the gear frame 28.

The clutch section 34 is controlled by the transmission control mechanism 30 in such a way so as to be engaged in synchronization with reverse-gear turning by the reversing gear mechanism 29.

The clutch section 34 comprises a movable section 32 and a fixed section 33. The movable section 32 is turnably provided on the shaft 22 fixed to the arm 6, and is fixed to the gear frame 28. The fixed section 33 is fixed to the arm 6. The movable section 32 and the fixed section 33 can be coupled together by way of the transmission control mechanism 30.

When the clutch section 34 is engaged, the movable section 32 and the fixed section 33 become coupled to each other through contact between their clutch plates or the like, as a result of which the gear frame 28 gets coupled to the arm 6 via the clutch section 34. The gear frame 28 is prevented thereby from turning about the shaft 22.

When the clutch section 34 is disengaged, on the other hand, the movable section 32 and the fixed section 33 are no longer coupled together, and hence the gear frame 28 can turn about the shaft 22.

The transmission control mechanism 30 engages the clutch section 34 upon unlocking of reverse-gear turning by the reversing gear mechanism 29, and disengages the clutch section 34 upon locking of reverse-gear turning by the reversing gear mechanism 29.

As a result, the gear frame 28 can be coupled to the arm 6 by way of the clutch section 34 when reverse-gear turning is unlocked by the reversing gear mechanism 29. The gear frame 28 is prevented thereby from turning about the shaft 22 on account of the reaction to the reverse-gear turning of the arm 4. The arm 4 can thus execute reverse-turning more stably on the arm 6.

The joint 7 in the present embodiment has the same configuration as the joint 5. When the collision detection unit 9 detects that the contact sensor 13 is switched on, therefore, the arm 6 can be caused to turn in a withdrawing direction, whereby the arm 6 moves quickly away from the obstacle 72.

The electric configuration of the robot arm 1 is explained next with reference to FIG. 4.

FIG. 4 is a block diagram illustrating the electric configuration of the robot arm 1 in Embodiment 1 of the present invention.

As illustrated in FIG. 4, the robot arm 1 comprises the input unit 10, the hand 2, the arms 4, 6, the arm base 8, the joints 3, 5, 7, the collision detection unit 9, a plurality of motor driving units 36 that drive the motors 35 provided in the respective joints 3, 5, 7, a plurality of lock mechanism driving units 37 that drive respective switching portion bodies 31 and clutch sections 34 that are provided in the joints 5, 7, and the control unit 11 that controls the motor driving units 36 and lock mechanism driving units 37 of the joints 3, 5, 7.

An encoder 19, provided so as to be coupled to the shaft 20 of the motor 35, detects the amount of turning of the shaft 20. The output of the encoder 19 is fed back to the motor driving unit 36. The rotational speed, rotational position and so forth of the motor 35 are controlled thereby.

The rotation information of the motor 35 is inputted by the encoder 19 to the control unit 11. The control unit 11 calculates, on the basis of that information, the position and attitude of the hand 2, the arm 4 and the arm 6.

Each lock mechanism driving unit 37 is switched on based on a setting from the control unit 11. Specifically, when the collision detection unit 9 detects that the contact sensor 12 or the contact sensor 13 is switched on, the control unit 11 engages the clutch section 34, and causes the switching portion body 31 of the transmission control mechanism 30 to be driven by the lock mechanism driving unit 37, to cause thereby the shaft 26 to move in the B direction. As a result, the reversing gear mechanism 29 performs reverse-gear turning, whereby the arm 4 or arm 6 can be moved in a direction opposite to the direction in which it had moved, for instance in the withdrawing direction away from the obstacle 72.

In a normal condition in which the arm 4, 6 is not colliding with the obstacle 72, the control unit 11 disengages the clutch section 34, and causes the switching portion body 31 of the transmission control mechanism 30 to be driven by the lock mechanism driving unit 37, to cause thereby the shaft 26 to move in the A direction. As a result, reverse-gear turning by the reversing gear mechanism 29 is locked, and the arm 4 or arm 6 can be moved through driving of the motor 35.

The operation of the robot arm 1 is explained next with reference to FIG. 5 and FIGS. 6A to 6D.

Figure 5:
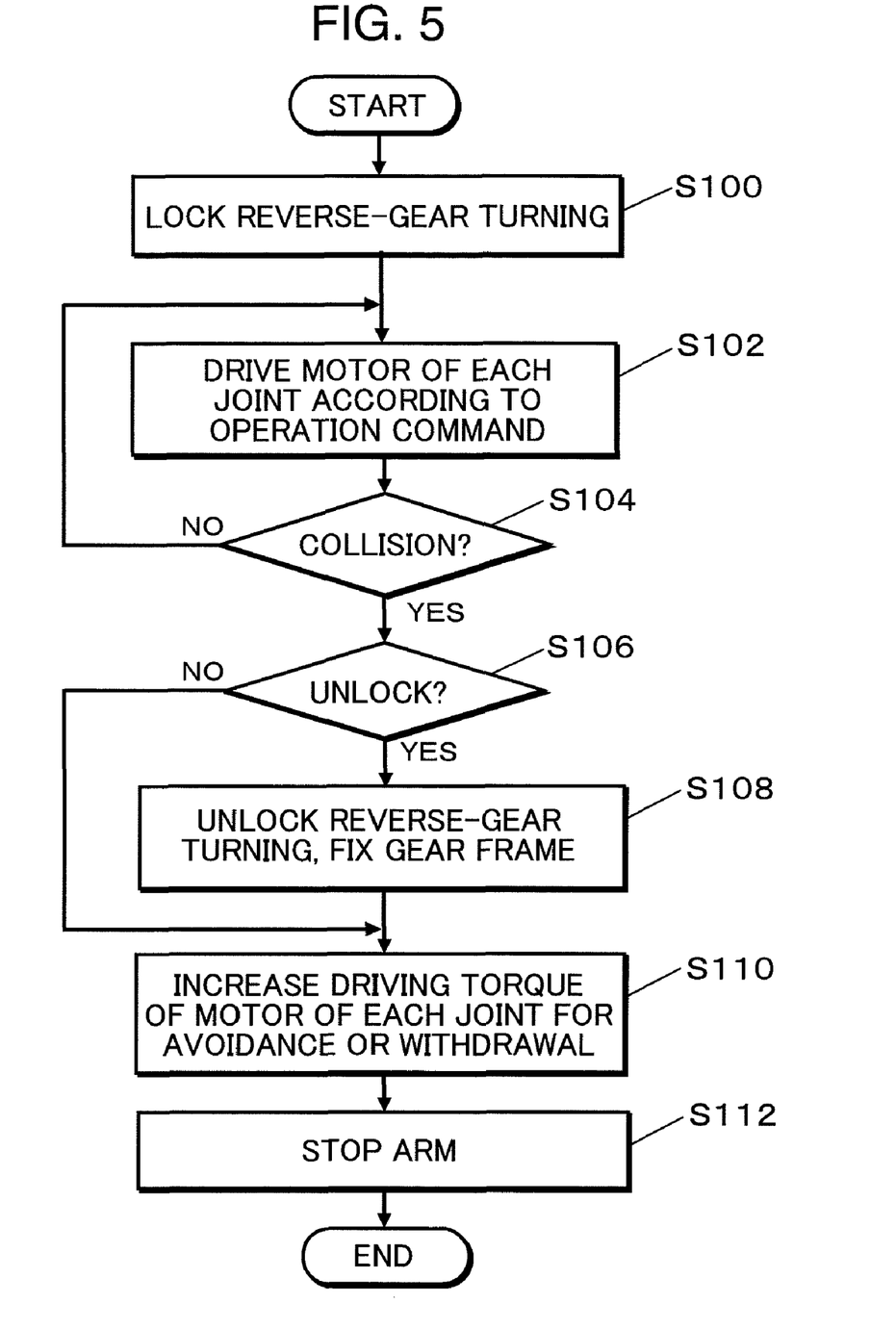
FIG. 5 is a flowchart for explaining the operation flow of the robot arm.

FIG. 5 is a flowchart for explaining the operation flow of the robot arm 1 in Embodiment 1 of the present invention. FIGS. 6A to 6D are explanatory diagrams for explaining the operation of the robot arm 1.

Figure 6A:
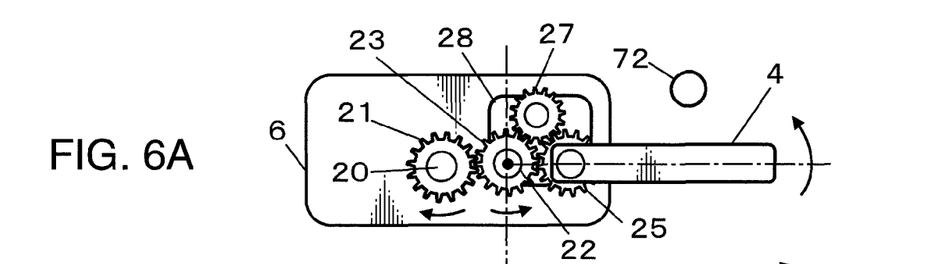
FIGS. 6A to 6D are explanatory diagrams for explaining the operation of the robot arm.

The robot arm 1 performs firstly an initial setup for moving the arms 4, 6, as illustrated in FIG. 5. Specifically, the reversing gear mechanism 29 is unlocked, and in the gear frame 28 the arms 4, 6 are returned to an initial position. The arms 4, 6 return to the initial position through detection of a marking position of the arms 4, 6 by an initial position detection unit (not shown) that is provided in the gear frame 28. A position such as the one illustrated in FIG. 6A is set for instance as the initial position of the arm 4. Next, the control unit 11 drives the switching portion body 31 by way of the lock mechanism driving unit 37, to cause the shaft 26 to move in the A direction, and disengages at the same time the clutch section 34 (step S100). As a result, reverse-gear turning of the drive gear 23 and the follower gear 25 becomes locked, and the gear frame 28 is freed. The arms 4, 6 are brought thereby to a state in which they can turn in the same direction as the turning direction of the drive gear 23.

Next, the control unit 11 of the robot arm 1 drives the respective motors 35 of the hand 2 and the arms 4, 6, by way of the respective motor driving units 36, in accordance with an operation command from the input unit 10, to cause the hand 2 and the arms 4, 6 to move (step S102). The gear frame 28 and the follower gear 25 turn then, integrally with the drive gear 23, about the shaft 22 of the drive gear 23. The arm 4 turns in the same direction as the turning direction of the drive gear 23, as illustrated for instance in FIG. 6A. In response to turning of the motor output gear 21, the arm 4 turns about the shaft 22, integrally with the gear frame 28 and the follower gear 25. That is, the arm 4 turns in a direction opposite to the turning direction of the motor 35.

As illustrated in FIG. 5, the robot arm 1 assesses next the output information of the collision detection unit 9, and detects whether the arm 4, 6 is colliding against the obstacle 72 (step S104).

If the collision detection unit 9 detects no collision, the robot arm 1 executes repeatedly step S102 and step S104, and the arms 4, 6 are allowed to move.

Figure 6B:
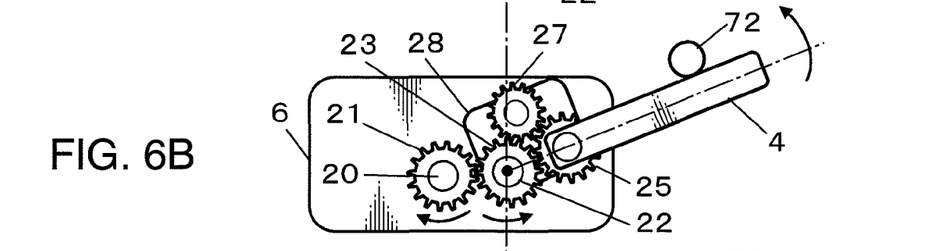

When the arm 4 or the arm 6 collides against the obstacle 72 and the collision detection unit 9 detects that the contact sensor 12 or the contact sensor 13 is switched on, the process proceeds to step S106. When the obstacle 72 and the arm 4 collide, for instance as illustrated in FIG. 6B, and the collision detection unit 9 detects that the contact sensor 12 is switched on, the process proceeds to step S106.

If the contact sensor 12 is switched on, the robot arm 1 detects the collision position that denotes the site of the arm 4 or the arm 6 at which collision has occurred. The control unit 11 determines whether the reversing gear mechanism 29 is to be unlocked or not, in accordance with the collision position (step S106).

The reversing gear mechanism 29 is unlocked when the robot arm 1 determines that the collision position is at the movement direction side of the arm 4 or the arm 6 (step S108). By contrast, the reversing gear mechanism 29 is kept locked, and the process proceeds to step S110, when the robot arm 1 determines that the collision position is at the opposite side of the movement direction of the arm 4 or the arm 6.

To unlock the reversing gear mechanism 29, the robot arm 1 drives the switching portion body 31 to cause the shaft 26 to move in the B direction, and engages clutch section 34 (step S108). The reversing gear mechanism 29 is unlocked as a result, whereby reverse-gear turning is enabled in the drive gear 23 and the follower gear 25. At the same time, the gear frame 28 is fixed to the arm 6, so that the gear frame 28 is prevented from turning about the shaft 22.

Next, the robot arm 1 increases the driving torque of the motor 35 of the joint 5 or of the joint 7. Alternatively, the driving torque of the motor 35 is set to a maximum driving torque (step S110). For instance, the robot arm 1 increases torque to 1.5 kg·cm when the arms 4 and 6 are driven with a torque of 1 kg·cm. Arm withdrawal can be made yet faster thereby.

Figure 6C:
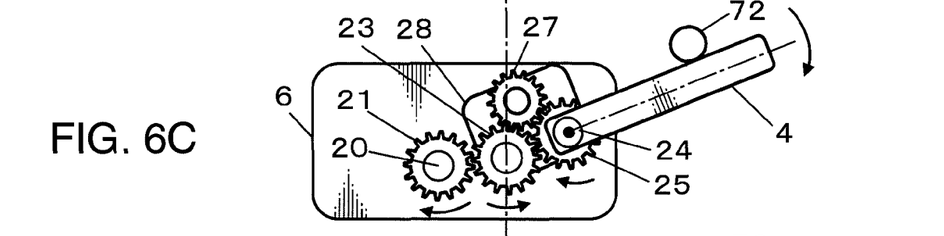
Figure 6D:
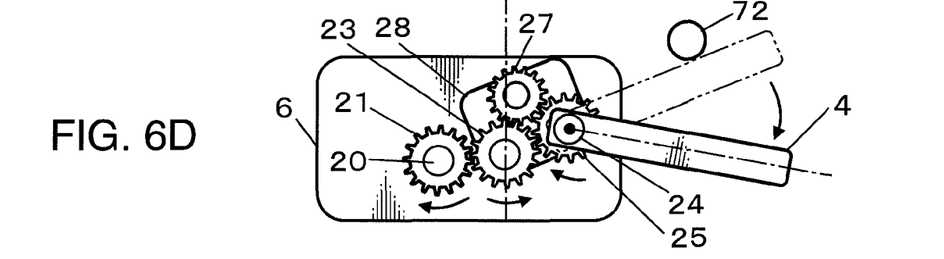

When reverse-gear turning by the reversing gear mechanism 29 is unlocked, after or during increase in the driving torque of the motor 35, the robot arm 1 causes the unlocked arm 4 or arm 6 to move in a direction opposite to the direction in which the arms moved in step S102, i.e. causes the unlocked arm 4 or arm 6 to move in a direction away from the obstacle 72. Herein, the follower gear 27 moves to the unlock position, as illustrated in, for instance, FIG. 6C, whereby the drive gear 23 and the follower gear 25 can turn in opposite directions. As a result, as shown in FIG. 6D, the arm 4 turns about the shaft 24 so as to withdraw away from obstacle 72. That is, the arm 4 can turn in the same direction as the turning direction of the motor 35.

The robot arm 1 can modify thus the turning direction of the arm 4 without modification of the turning direction of the motor 35.

By contrast, when reverse-gear turning by the reversing gear mechanism 29 is locked, the impact force caused by a collision at the rear of the arm can be cushioned through accelerated turning of the arm 4.

The turning speed of the arm 4 can be increased when reverse-gear turning by the reversing gear mechanism 29 is locked.

Returning now to FIG. 5, the robot arm 1 stops the arm 4 at a predetermined position away from the obstacle 72 (step S112). The robot arm 1 returns the position of the arms 4, 6 to the initial position in the gear frame 28. The reversing gear mechanism 29 is locked once the arms 4, 6 of the robot arm 1 are returned to the initial position.

As described above, in the robot arm 1 provided by Embodiment 1, the influence of collision (impact force due to collision) can be mitigated in the robot arm 1. Specifically, the turning direction of the arm 4 can be modified without modification of the turning direction of the motor 35, through the use of the transmission control mechanism 30, when the robot arm 1 detects collision of the arm 4 against the obstacle 72. As a result, when the collision detection unit 9 detects that the arm 4 or arm 6 has collided against the obstacle 72, the robot arm 1 can change the turning direction of the colliding arm 4 or arm 6, to cause the colliding arm 4 or arm 6 to turn quickly in the withdrawing direction, and move thus quickly away from the obstacle 72.

In the robot arm 1 of the present embodiment, the switching portion body 31 is switched on to cause the shaft 26 to move in the B direction, whereby the reversing gear mechanism 29 is unlocked. This affords as a result a faster response, namely a shorter duration of the pushing of the arm 4 or 6 against the obstacle 72, as compared with a case of slowdown/ reverse of the motor by means of a servo system. The influence of collision (impact force due to collision) can be further mitigated as a result.

In the robot arm 1 of the embodiment, the driving force from the motor 35 is transmitted to the arms 4, 6 by way of the reversing gear mechanism 29. Therefore, the attitude of the arms 4, 6 does not change on account of their own weight. For instance, the arms 4, 6 do not drop even when reverse-gear turning by the reversing gear mechanism 29 is unlocked.

In the robot arm 1 of the embodiment, the turning direction of the arms 4, 6 is modified without modification of the turning direction of the motor 35. As a result, there is no need for cushioning the impact force, upon collision against the obstacle 72, by limiting the driving current of the motor 35. The arms 4, 6 can therefore be withdrawn quickly to a safe position, without lowering of the driving force of the motor 35.

In the robot arm 1 of the present embodiment, the arms 4, 6 are withdrawn from the obstacle 72 without the turning direction of the motor 35 being modified upon collision. This makes it unnecessary to switch the direction of the current that is supplied to the motor 35, and allows preventing as a result excessive currents that are generated during current switching. Damage of the electric circuits of the motor 35 and the motor driving unit 36 can be prevented thereby.

In the robot arm 1 of the embodiment, the drive gear 23, the follower gear 25 and the follower gear 27 mesh with each other in such a manner that the teeth of one gear match the lands of the other gear, at the position at which the gears mesh with each other, and the follower gear 27 is caused to move while meshing with the follower gear 25. Gears can mesh with each other easily as a result. Since the follower gear 27 moves while meshing with the follower gear 25, the follower gear 27, the drive gear 23 and the follower gear 25 can be synchronized during motion of the follower gear 27. Gears can mesh with each other easily as a result, both when the drive gear 23 and the follower gear 25 are locked and unlocked.

The leading end of the gear teeth may be shaped as an arc. This makes for smooth meshing of the gears with each other.

When the information of the contact sensor 12 or the contact sensor 13 is inputted directly to the switching portion body 31, and the contact sensor 12 or the contact sensor 13 is switched on, the shaft 26 may be caused to move in the B direction through switching on of the switching portion body 31 of the transmission control mechanism 30. The above configuration allows further increasing responsiveness during a collision. The above configuration allows the arm 4, 6 to move quickly in a direction opposite to the direction in which it had moved, i.e. to move in a withdrawing direction away from the obstacle 72 upon reverse-gear turning by the reversing gear mechanism 29.

Figure 7:
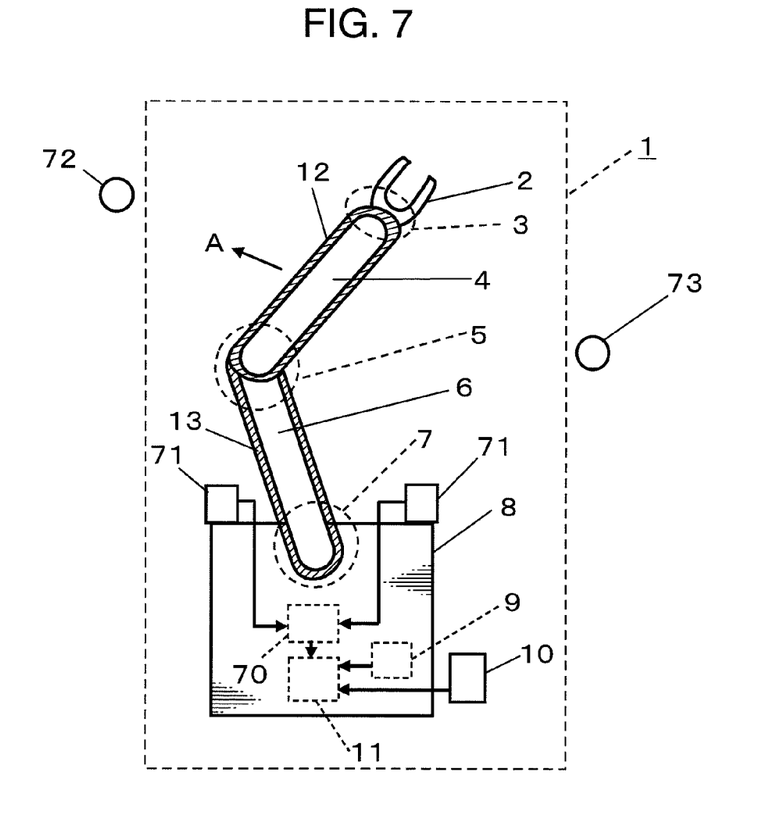
FIG. 7 is a layout diagram illustrating the arrangement of an imaging unit in the robot arm.

Upon collision detection, the robot arm 1 moves the arms 4, 6 in a withdrawing direction away from the obstacle 72. Collision detection, however, is not limited to detection of contact between the robot arm 1 and the obstacle 72, and may include, for instance, prediction of danger of collision. For instance, the robot arm 1 may comprise, provided in the arm base 8, a plurality of imaging units 71 and a collision monitoring unit 70 that monitors collision of the hand 2 and the arms 4, 6 on the basis of images captured by the imaging units 71, as illustrated in FIG. 7. The collision monitoring unit 70 analyzes the obtained captured images to monitor the motion of the obstacle 72 and the positional relationship between the obstacle 72, the hand 2 and the arms 4, 6, and to assess the likelihood of collision. The robot arm 1 is aware of the position of the hand 2 and the arms 4, 6, and hence the likelihood of collision with the obstacle 72 can be assessed on the basis of the captured images.

In this case, the robot arm 1 inputs collision assessment information from the collision monitoring unit 70 to the control unit 11, and when it is judged that collision is possible, the transmission control mechanism 30 is controlled in such a manner that the hand 2 or the arm 4, 6 moves away from the obstacle 72. Specifically, the robot arm 1 unlocks reverse-gear turning by the reversing gear mechanism 29 by way of the transmission control mechanism 30 when the collision monitoring unit 70 outputs collision assessment information according to which it is determined that the obstacle 72 stands in the movement direction (A direction in FIG. 7) of the hand 2 and the arms 4, 6. On the other hand, the robot arm 1 locks the reversing gear mechanism 29 when the collision monitoring unit 70 outputs collision assessment information according to which it is determined that obstacle 73 stands in a direction opposite to the movement direction (A direction in FIG. 7) of the hand 2 and the arms 4, 6. The collision monitoring unit 70 of the robot arm 1 assesses proximity of the obstacle 72 and unlocks the reversing gear mechanism 29 when it is determined that there is an obstacle 72 that stands in the movement direction of the arms 4, 6 (direction at which the arms 4, 6 are aimed) and a collision would occur. The robot arm 1 can cause thereby the arms 4, 6 to move in a direction away from the obstacle 72, i.e. to move in a collision avoidance direction.

The joint 3 may be configured in the same manner as the joint 5. This allows cushioning impact forces on the hand 2 during collision, or collision avoidance, with the obstacle 72. To detect collision of the hand 2 against personnel or against an obstacle, a contact sensor identical to the above-described contact sensors 12, 13 may be disposed on the outer cladding of the hand 2, such that the output of the contact sensor is inputted to a collision detection unit.

The control unit 11 of the robot arm 1 may be provided with a coordinating program for coordinating the motion of the joint 3, the joint 5 and the joint 7. In such a configuration, the joint 3, the joint 5 and the joint 7 are coordinated through execution of the coordinating program, to allow the hand 2 or the arms 4, 6 to move away from the obstacle 72. The reversing gear mechanisms 29 of the joint 5 and the joint 7, for instance, are unlocked when the obstacle 72 stands in the movement direction of the arms 4, 6, as illustrated in FIGS. 6B to 6C. The arm 4 can move quickly away from the obstacle 72 as a result.

The explanation of the present embodiment deals with a robot arm having 3 degrees of freedom. The embodiment, however, is not limited thereto, and may be applied to the joints of a robot arm having 1, 2 or 4 or more degrees of freedom. Of course, the embodiment need not necessarily apply to all joints, and may be arbitrarily applied to selected joints.

The joints that carry out the reversing action may be arbitrarily selected in a configuration where a reversing gear mechanism 29 is provided in each of a plurality of joints. Specifically, the movement direction of the obstacle 72 and the driving direction of each joint 5, 7 of the arms 4, 6 is checked, and the reversing action is performed for all or some of the joints 5, 7 that are driven in a direction opposite to the movement direction of the obstacle 72.

In the embodiment explained above, the driving force of the motor 35 is transmitted to the arm 4 by gear transmission. The embodiment, however, is not limited thereto, and the arms 4, 6 may be driven, for instance, by belt transmission. A belt transmission can be made lighter and more compact than a gear transmission. The stretchability of the belt can also be actively exploited for impact cushioning. Belt transmission allows realizing quiet driving, with only slight shocks upon driving force transmission. Moreover, belt transmission enables driving force transmission even if the driving section is separated from the driven section. In addition, belt transmissions require no lubricant. A reducer having a high reduction ratio, such as a harmonic drive (TM), need to be provided on the driven side when controllability and positional precision at the leading end of the arm are to be maintained in the case of belt transmission. In this case, it is difficult to elicit impact cushioning by relying on belt stretchability. Gear transmission, by contrast, requests no tension regulation. Also, gear transmissions allow increasing responsiveness and reducing driving loss, as compared to belt transmissions.

Embodiment 2

Another configuration example of the reversing gear mechanism 29 will be explained next with reference to FIG. 8.

Figure 8:
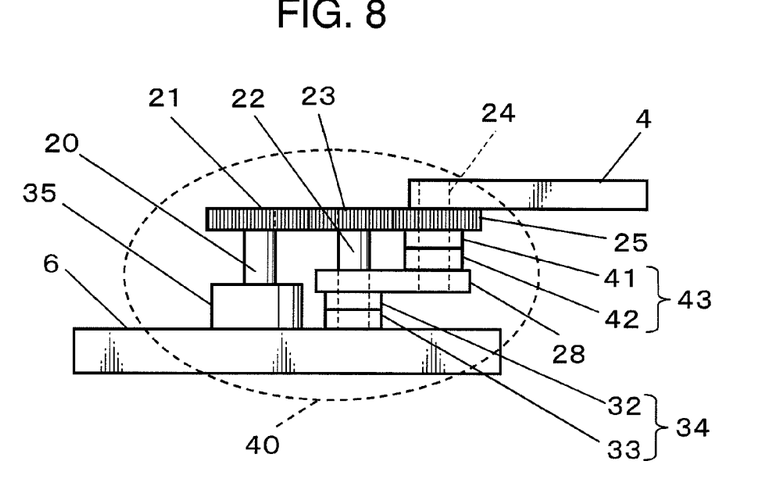
FIG. 8 is a schematic diagram illustrating the configuration of a joint of a robot arm in Embodiment 2 of the present invention.

FIG. 8 is a schematic diagram illustrating the configuration of a joint 40 of a robot arm 1 in Embodiment 2 of the present invention. Functions identical to those of the robot arm 1 in Embodiment 1 are denoted with the same reference numerals.

In Embodiment 1, reverse-gear turning of the reversing gear mechanism 29 is locked through displacement of the follower gear 27 to the lock position, and is unlocked through displacement of the follower gear 27 to the unlock position. Embodiment 2 differs from Embodiment 1 in that now the reverse-gear turning of the reversing gear mechanism 29 is locked using a clutch mechanism instead of the follower gear 27.

A specific configuration example of the joint 40 is explained next. As illustrated in FIG. 8, a transmission control mechanism 30 in the joint 40 comprises a clutch section 43, and by driving this clutch section 43 the turning of the follower gear 25 is locked. Specifically, the clutch section 43 is driven to lock the turning of the follower gear 25, whereby the turning of the drive gear 23 is locked. Reverse-gear turning by the reversing gear mechanism 29 becomes locked as a result.

The clutch section 43 comprises a movable section 41 and a fixed section 42. The movable section 41 is turnably provided on the shaft 24 that is fixed to the gear frame 28, and is fixed to the follower gear 25. The fixed section 42 is fixed to the gear frame 28. The clutch section 43 is configured so that the movable section 41 and the fixed section 42 can become coupled to each other.

When the clutch section 43 of the joint 40 is switched on, the movable section 41 and the fixed section 42 become coupled to each other through contact between their clutch plates or the like, and the follower gear 25 becomes coupled to the gear frame 28 via the clutch section 43. Turning of the follower gear 25 about the shaft 24 is locked as a result, and the follower gear 25 turns integrally with the gear frame 28 about the drive gear 23. When the clutch section 43 is switched off, on the other hand, the movable section 41 and the fixed section 42 are no longer coupled together, and hence the follower gear 25 can turn about the shaft 24, whereupon the follower gear 25 turns in the opposite direction to that of the drive gear 23.

The clutch section 34 for locking the gear frame 28 is engaged in synchronization with reverse-gear turning by the reversing gear mechanism 29. That is, the transmission control mechanism 30 disengages the clutch section 34 when it engages the clutch section 43, and engages the clutch section 34 when it disengages the clutch section 43.

Upon reverse-gear turning by the reversing gear mechanism 29, as a result, the gear frame 28 can be fixed to the arm 6 via the clutch section 34, in such a manner that the gear frame 28 is not free when in operation. This allows stabilizing the operation during driving force transmission the drive gear 23 to arm 4.

As described above, the robot arm 1 in Embodiment 2 of the present invention allows unlocking immediately the turning of the follower gear 25 by switching the clutch section 43 off. Reverse-gear turning of the reversing gear mechanism 29 is enabled as a result. Therefore, unlocking of reverse-gear turning by the reversing gear mechanism 29 requires no control operation such as displacement of the follower gear 27 or the like. Avoidance responsiveness during collision can be further enhanced thereby. Also, the arm 4 can be caused to turn in a direction opposite to the direction in which it had turned, namely to turn in a withdrawing direction away from the obstacle 72, without modification of the turning direction of the motor 35.

The joint 40 between the arm 4 and the arm 6 has been explained in Embodiment 2 above, but the configuration of the joint 40 can be used in the joint 7 as well.

In Embodiment 2, the clutch section 43 is provided in the shaft 24 to allow locking or unlocking the turning of the follower gear 25 about the shaft 24, but the embodiment is not limited to such a configuration. For instance, the embodiment may be configured in such a manner that turning of the drive gear 23 about the shaft 22 is locked or unlocked by way of the clutch section 43. Such a configuration has likewise the effect of allowing locking or unlocking the reverse-gear turning of the drive gear 23 and the follower gear 25.

Embodiment 3

Figure 9:
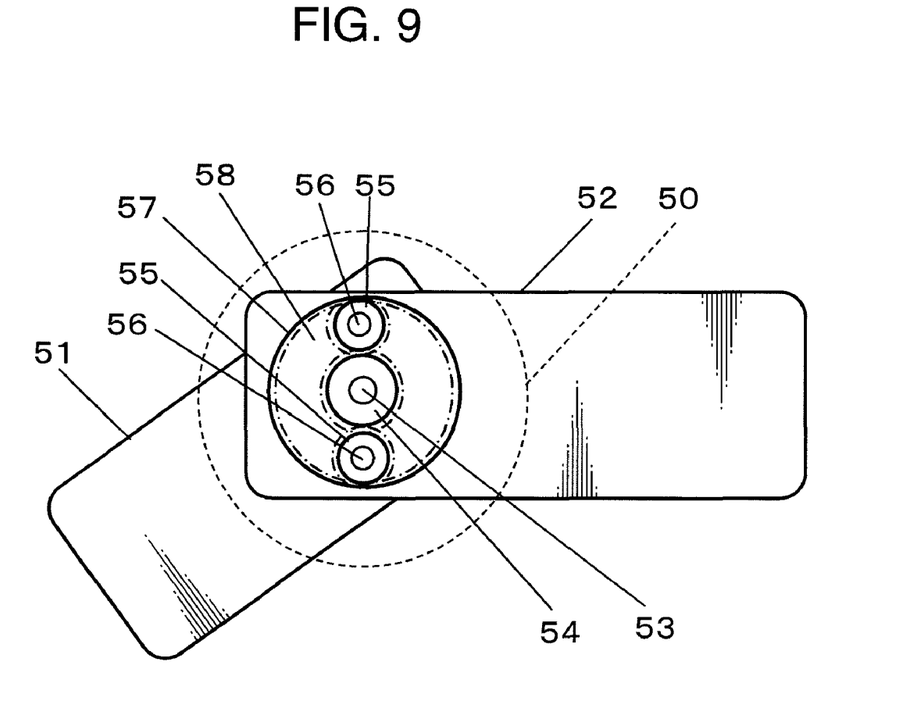
FIG. 9 is a schematic diagram illustrating the configuration of a joint of a robot arm in Embodiment 3 of the present invention.

Another configuration example of the reversing gear mechanism 29 will be explained next with reference to FIG. 9. FIG. 9 is a schematic diagram illustrating the configuration of the joint 50 of the robot arm 1 in Embodiment 3 of the present invention. Functions identical to those of the robot arm 1 in Embodiment 1 are denoted with the same reference numerals.

Embodiment 3 differs from Embodiment 1 in that reverse-gear turning is carried out now using a planetary gear mechanism.

A specific configuration example of a joint 50 is explained next. As illustrated in FIG. 9, an arm 51 is coupled to an arm 52 by way of a joint 50.

The joint 50 causes the arm 52 to turn on account of the driving force from a motor (not shown) that is fixed to the arm 51.

A drive gear 54 is fixed to a shaft 53 of the motor (not shown). An outer ring gear 57 is disposed concentrically with the drive gear 54, while encompassing a plurality of follower gears 55, with the drive gear 54 in between. The rotating follower gears (first follower gear, third follower gear) 55 turn about the drive gear 54 while meshing with the drive gear 54 and the outer ring gear 57. That is, the drive gear 54 functions as a sun gear, and the follower gears 55 function as planetary gears that revolve about the drive gear 54 while meshing with the inner teeth of the outer ring gear 57. The outer ring gear 57 turns in phase with the follower gears 55. The outer ring gear 57 is integrally mounted to an arm 52.

The driving force of the shaft 53 of the motor is transmitted to the arm 52 via the drive gear 54, the follower gears 55 and the outer ring gear 57. As a result, the outer ring gear 57 turns in a direction opposite to the turning direction of the drive gear 54 that is fixed to the shaft 53, and the arm 52 turns integrally with the outer ring gear 57. A gear frame 58 is turnably provided on the shaft 53. The follower gears 55 are rotatably provided on shafts 56 that are fixed to the gear frame 58.

When in such a configuration the turning of the follower gears 55 is locked, the drive gear 54 and the outer ring gear 57 become coupled to each other by way of the follower gears 55, as a result of which the drive gear 54 and the outer ring gear 57 take the same turning direction.

Figure 10:
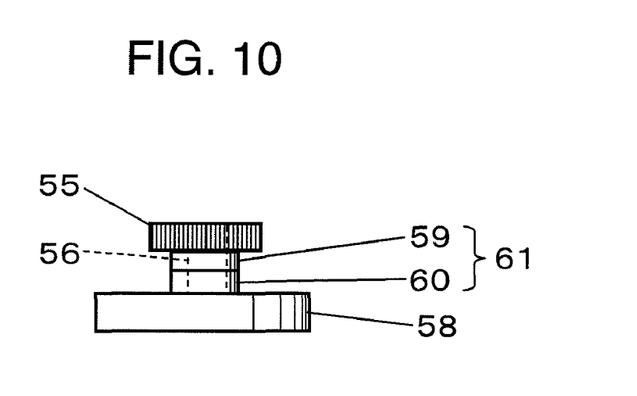
FIG. 10 is a schematic diagram illustrating the configuration of the relevant portion of a joint in the robot arm.

An instance of locking of the turning of the follower gears 55 will be explained next with reference to FIG. 10. FIG. 10 is a schematic diagram illustrating the configuration of the relevant portion of the joint 50 of the robot arm 1 in Embodiment 3 of the present invention.

As illustrated in FIG. 10, the transmission control mechanism 30 comprises a clutch section 61 that is configured so as to lock the turning of the follower gears 55. Specifically, the clutch section 61 comprises a movable section 59 and a fixed section 60. The movable section 59 is turnably provided on the shafts 56, and is fixed to the follower gears 55. The fixed section 60 is fixed to the gear frame 58. Moreover, the configuration is provided so that the movable section 59 and the fixed section 60 can become coupled to each other.

When the clutch section 61 is engaged, the movable section 59 and the fixed section 60 become coupled to each other through contact between their clutch plates or the like, and the follower gears 55 become coupled to the gear frame 58 via the clutch section 61. Turning of the follower gears 55 about the shafts 56 becomes locked as a result.

When the clutch section 61 is disengaged, on the other hand, the movable section 59 and the fixed section 60 are no longer coupled together, and hence the follower gears 55 can turn about the shafts 56.

In Embodiment 3, the clutch section 34 (FIG. 8) may be provided on the shaft 53, as is the case in Embodiment 2, so that the clutch section 34 is engaged in synchronization with reverse-gear turning by the reversing gear mechanism 29. That is, the transmission control mechanism 30 disengages the clutch section 34 when the clutch section 61 is engaged, and engages clutch section 34 when the clutch section 61 is disengaged.

Upon reverse-gear turning by the reversing gear mechanism 29, as a result, the gear frame 58 can be fixed to an arm 51 via the clutch section 34, so as not to free when in operation. This allows stabilizing the operation during driving force transmission from the drive gear 54 to arm 52.

The clutch section 61 is set to be engaged during ordinary use of the robot arm 1, i.e. when the arm 51 is caused to move in accordance with an operation command from the input unit 10. The movable section 59 and the fixed section 60 of the clutch section 61 are coupled to each other, and hence turning of the follower gears 55 about the shafts 56 becomes locked as a result. This allows the turning direction of the motor and the turning direction of the arm 52 to be the same direction.

The clutch section 61 is disengaged when the collision detection unit 9 detects collision of the robot arm 1. The movable section 59 and the fixed section 60 become uncoupled thereby, and the follower gears 55 turn about the shafts 56. The drive gear 54 and the follower gears 55 perform reverse-gear turning as a result. This allows the arm 52 of the robot arm 1 to move in a direction opposite to the direction in which it had moved, i.e. to move in a withdrawing direction away from the obstacle 72.

In the robot arm 1 in Embodiment 3 of the present invention, disengagement of the clutch section 61 allows the follower gears 55 to be unlocked at once, and allows the drive gear 54 and the follower gears 55 to perform reverse-gear turning. Therefore, the reversing operation can take place without the need for a control operation such as displacement of the follower gear 27 or the like. Avoidance responsiveness during collision can be further enhanced thereby.

Unlocking of the follower gears 55 in the robot arm 1 of Embodiment 3 allows the arm 52 to move in a direction opposite to the direction in which it had moved, i.e. to move in a withdrawing direction away from the obstacle 72, without modification of the turning direction of the motor.

The collision monitoring unit 70 (FIG. 7) may be provided in place of the collision detection unit 9.

Embodiment 4

Another configuration example of the reversing gear mechanism 29 will be explained next with reference to FIG. 11.

Figure 11:
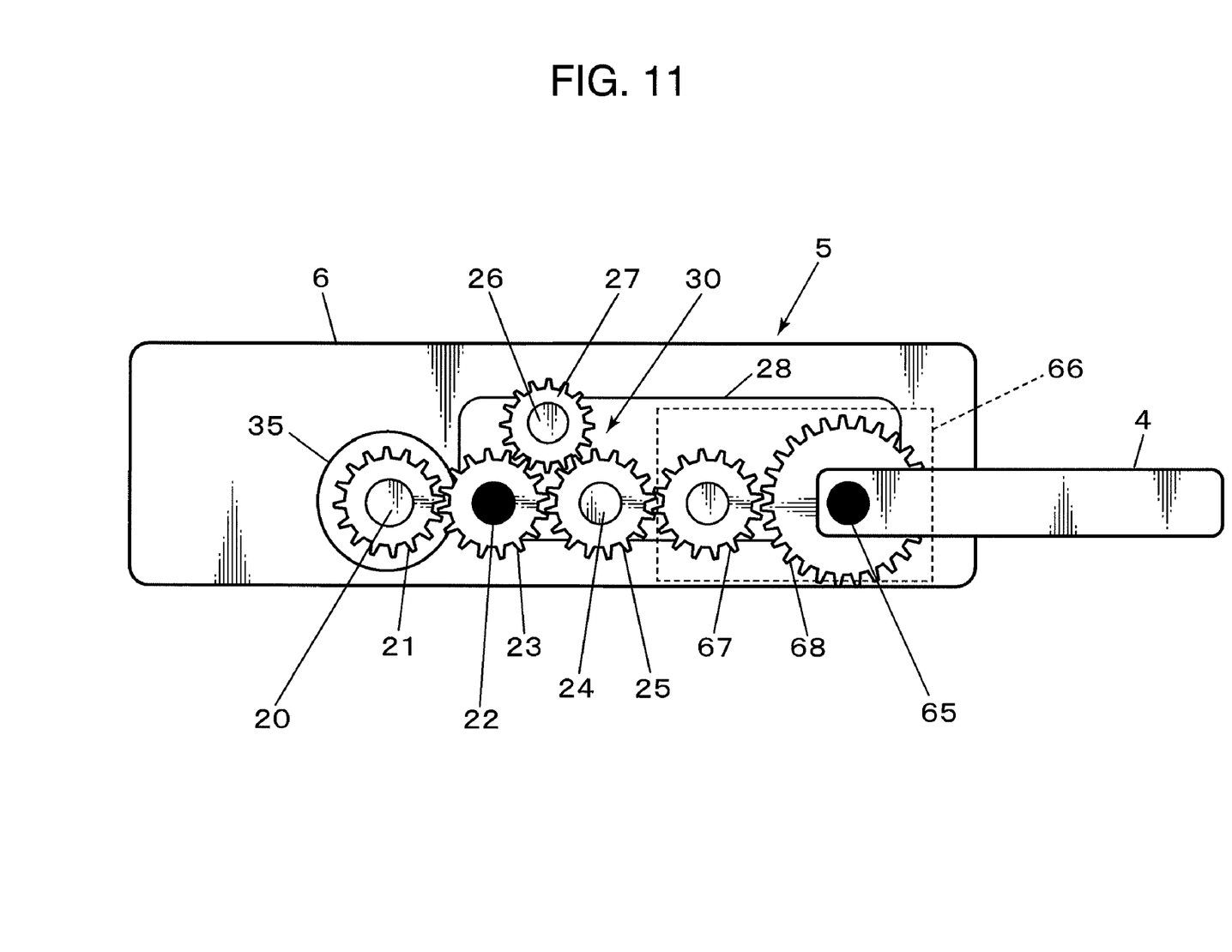
FIG. 11 is a schematic diagram illustrating the configuration of a joint of a robot arm in Embodiment 4 of the present invention.

FIG. 11 is a schematic diagram illustrating the configuration of the joint 5 of the robot arm 1 in Embodiment 4 of the present invention. Functions identical to those of the robot arm 1 in Embodiment 1 are denoted with the same reference numerals.

In Embodiment 1, the follower gear 25 is turnably provided on the pivot shaft 24 that is fixed to the gear frame 28, so that the arm 4 turns about the pivot shaft 24. In Embodiment 4, however, the pivot shaft of the arm 4 is provided separately from the pivot shaft 24 of the follower gear 25. Specifically, an arm shaft 65 extending parallel to the shaft 24 is fixed to the gear frame 28, such that the arm 4 is turnably provided on the arm shaft 65. The driving force from the follower gear 25 (first follower gear) is transmitted to the arm 4 by way of a transmission mechanism 66. In other words, the arm 4 moves in synchronization with the motion of the follower gear 25.

The transmission mechanism 66 has a first transmission gear 67 that meshes with the follower gear 25, and a second transmission gear 68 that meshes with the first transmission gear 67 and is turnably provided on the arm shaft 65. The second transmission gear 68 is fixed to the arm 4. Upon turning of the follower gear 25, therefore, the second transmission gear 68 turns on account of the turning of the first transmission gear 67, and the arm 4 turns integrally with the second transmission gear 68. The arm 4 turns here in the same direction as the follower gear 25. Therefore, the turning direction of the arm 4 can be reversed, without changing the rotation direction of the motor 35, when a collision of the robot arm 1 with the obstacle 72 is detected or predicted. This allows cushioning the impact of the collision.

The first transmission gear 67 and the second transmission gear 68 become fixed relative to the gear frame 28 when turning of the follower gear 25 relative to the drive gear 23 is locked by the transmission control mechanism 30. As a result, the follower gear 27, the follower gear 25, the first transmission gear 67, the second transmission gear 68 and the arm 4 turn about the shaft 22 of the drive gear 23, together with the gear frame 28, when the drive gear 23 is driven by the motor 35.

The required strength of the gear frame 28 can thus be eased off by imparting a reducing function by gear coupling. In Embodiment 4, speed reduction takes place between the first transmission gear 67 and the second transmission gear 68.

In Embodiment 4 as well, the collision monitoring unit 70 (FIG. 7) may be provided in place of the collision detection unit 9.

As explained above, Embodiments 1 to 4 of the present invention afford a robot arm 1 in which the impact force derived from a collision or from collision avoidance can be cushioned quickly.

Providing the robot arm 1 in a robot (not shown) allows the arm 4, 6 to move in a direction opposite to the direction in which it had moved, i.e. to move in a withdrawing direction away from the obstacle 72, but without modification of the turning direction of the motor, when the collision detection unit 9 detects a collision. The impact force of a collision between the arms 4, 6 and the obstacle 72 can be quickly cushioned in the robot as a result. The robot unlocks reverse-gear turning by the reversing gear mechanism 29 when the obstacle 72 stands at or near the movement direction of the robot, on the basis of collision information of the collision monitoring unit 70, so that the arm 4, 6 can move in a direction opposite to the direction in which it had turned, i.e. can move in a withdrawing direction away from the obstacle 72, to avoid a collision against the obstacle 72.

The motor 35 and the drive gear 23 may be coupled by way of a plurality of gears, or by way of a pulley and belts interposed in between. The structure of the arm 4 and the joint 5 can be simplified in that case since motor power is transmitted from the motor 35 that is provided not in the arm 4 or joint 5, but in the arm base 8 or the like.

Embodiment Overview

The above embodiments can be summarized as follows.

(1) The robot in the above embodiments comprises: a drive gear that has a shaft; a gear frame that can turn about the shaft of the drive gear; a first follower gear having a shaft fixed to the gear frame and that can turn, in synchronization with the drive gear, about the shaft, in a direction opposite to the turning direction of the drive gear; a transmission control mechanism that is capable of locking the first follower gear to the drive gear; an arm that moves in synchronization with the first follower gear; and a collision detection unit that is capable of detecting a collision between the arm and an obstacle, wherein the transmission control mechanism unlocks the first follower gear from the drive gear in response to the detection, by the collision detection unit, of collision between the arm and the obstacle.

In the above configuration, when the first follower gear is locked to the drive gear and the latter is driven, the first follower gear turns about the drive gear, integrally with the latter. The first follower gear turns about the drive gear accompanying the turning of the gear frame that can turn about the shaft of the drive gear. Therefore, the arm turns about the shaft of the drive gear in the same direction as the drive gear. When the drive gear and the first follower gear are unlocked from each other, the turning direction of the first follower gear is reversed into the opposite direction to the turning direction of the drive gear. As a result, the arm turns about the shaft of the first follower gear in a direction opposite to that of the drive gear. The arm can turn thereby in a reverse direction, without modification in the turning direction of the drive gear. Specifically, the turning direction of the arm can be reversed without modification in the turning direction of a motor that drives the drive gear. Upon detection of collision of the arm against an obstacle, thus, the arm can turn in a withdrawing direction away from the obstacle, without modification of the rotation direction of the drive gear. A robot arm can be provided as a result in which the impact force of collisions is cushioned.

(2) In the above transmission control mechanism, the transmission control mechanism may have a second follower gear that can assume a lock position of locking or an unlock position of unlocking the first follower gear to/from the drive gear.

In the above aspect, the first follower gear can be switched between a locked state and an unlocked state through shifting of the position of the first follower gear between the lock position and the unlock position. Therefore, the driving force transmission state of the transmission control mechanism can be switched simply by way of a driving unit that drives the first follower gear and that is provided in the transmission control mechanism.

(3) At the lock position, the second follower gear may mesh with both the drive gear and the first follower gear, and at the unlock position, the second follower gear may mesh with either the drive gear or the first follower gear. That is, the transmission control mechanism may have a second follower gear that can move between two positions, namely the lock position at which reverse-gear turning of the drive gear and the first follower gear is locked, and the unlock position at which reverse-gear turning of the drive gear and the first follower gear is unlocked; such that at the lock position, the second follower gear meshes with the drive gear and the first follower gear, and at the unlock position, the second follower gear meshes with either the drive gear or the first follower gear.

In this aspect, moreover, when the second follower gear moves to the lock position, the first follower gear is locked through meshing of the drive gear, the first follower gear and the second follower gear, and when the second follower gear moves to the unlock position, the second follower gear meshes either with the drive gear or the first follower gear, and hence the first follower gear is unlocked from the drive gear.

(4) In the transmission control mechanism, the second follower gear may be capable of moving between the lock position and the unlock position while meshing with at least the drive gear or the first follower gear.

In this aspect, the first follower gear and the second follower gear can turn in synchrony also during motion of the second follower gear. The first follower gear is synchronized to the drive gear, and hence the second follower gear can mesh easily with the first follower gear or the drive gear also during displacement of the second follower gear.

(5) The transmission control mechanism may be configured so that when the first follower gear is locked to the drive gear by the transmission control mechanism, the gear frame is set to be able to turn about the shaft of the drive gear, and when the unlocking is effected, the gear frame is locked so as not to turn about the shaft of the drive gear.

In the above aspect, the gear frame can be fixed in such a manner that it does not move by reaction to the frame. Therefore, the driving force of the drive gear can be stably transmitted to the arm upon gear unlocking.

(6) The first follower gear may mesh directly with the drive gear. In this aspect, it is possible to realize a configuration that allows switching between locking and unlocking the concerted motion of the first follower gear with respect to the drive gear, using fewer components.

(7) The robot arm may further comprise an outer ring gear having inner teeth and being fixed to the arm, wherein the first follower gear may also be a planetary gear that can revolve around the drive gear while meshing with the inner teeth of the outer ring gear. Preferably, the outer ring gear is configured so that it can turn in phase with the first follower gear.

In the above aspect, the first follower gear revolves around the drive gear when the first follower gear is driven by the drive gear. The arm turns then accordingly in the same direction as the first follower gear. The outer ring gear becomes locked to the drive gear when the transmission control mechanism locks the concerted motion of the first follower gear with respect to the drive gear. Therefore, the arm turns integrally with the drive gear about the shaft of the drive gear.

(8) In the above aspect, the transmission control mechanism may comprise a clutch section having a movable section fixed to the first follower gear, and a fixed section fixed to the gear frame; the transmission control mechanism locking the first follower gear to the drive gear by coupling the movable section with the fixed section, and when the collision detection unit detects a collision of the arm the transmission control mechanism unlocking the first follower gear from the drive gear by separating the movable section from the fixed section.

The robot arm in the present embodiment may comprise, specifically, a reversing gear mechanism having a drive gear that is turnably assembled in a gear frame, a third follower gear that is turnably provided about the drive gear while meshing therewith, and an outer ring gear that meshes with the third follower gear that is inscribed in the outer ring gear, such that the outer ring gear turns in phase with the third follower gear, wherein the reversing gear mechanism performs reverse-gear turning in a direction different from the direction of the drive gear and of the third follower gear; a transmission control mechanism having a clutch section in which a movable section fixed to the third follower gear and a fixed section fixed to the gear frame can be coupled together, such that reverse-gear turning of the drive gear and the third follower gear is locked through coupling of the movable section and the fixed section when the clutch section is operated; an arm integrally mounted to the outer ring gear; and a collision detection unit that detects collision between the arm and an obstacle; wherein, when the collision detection unit detects collision of the arm, the transmission control mechanism disengages the clutch section to separate the movable section from the fixed section, and unlock thereby reverse-gear turning of the drive gear and the third follower gear.

In the above aspect, the reversing gear mechanism performs reverse-gear turning when reverse-gear turning of the third follower gear is unlocked through disengagement of the clutch section. Accordingly, the turning direction of the outer ring gear that turns in phase with the third follower gear is inverse to the turning direction of the drive gear. It becomes possible as a result to switch the turning direction of the arm, which is integrally mounted to the outer ring gear, to a direction opposite to the direction in which the arm was turning, without modification in the turning direction of the drive gear. The arm can be turned thus in a direction opposite to the direction in which it was turning, without modification of the turning direction of the motor that drives the drive gear. Upon detection of a collision between an arm and an obstacle in the robot arm of the present embodiment, thus, the arm can turn in a direction opposite to the direction in which it had turned, i.e. to turn in a withdrawing direction away from the obstacle. This allows cushioning as a result the impact force of collision.

(9) The robot arm in the present embodiment comprises: a drive gear that has a shaft; a gear frame that can turn about the shaft of the drive gear; a first follower gear that can turn, in synchronization with the drive gear, in a direction opposite to the turning direction of the drive gear; a transmission control mechanism capable of locking the first follower gear to the drive gear; an arm that moves in synchronization with the first follower gear; and a collision monitoring unit that monitors a collision between the arm and an obstacle, wherein the transmission control mechanism unlocks the first follower gear from the drive gear when the collision monitoring unit detects a possibility of collision between the arm and the obstacle that stands in a movement direction of the arm.

Specifically, the robot arm of the present embodiment may comprise a reversing gear mechanism, having a drive gear that is turnably assembled in a gear frame, and a first follower gear that meshes with the drive gear, and which performs reverse-gear turning in a direction different from to that of the drive gear and the first follower gear; a transmission control mechanism that locks reverse-gear turning of the drive gear and the first follower gear; an arm integrally mounted to the first follower gear; and a collision monitoring unit that monitors a collision between the arm and an obstacle; wherein the transmission control mechanism unlocks reverse-gear turning of the drive gear and the first follower gear when the collision monitoring unit detects a possibility of collision between the arm and the obstacle that stands in the movement direction of the arm.

In such a configuration, the reversing gear mechanism performs reverse-gear turning when the drive gear and the follower gear are unlocked. Therefore, the arm can turn in a direction opposite to the direction in which it was turning, without modification of the turning direction the drive gear. As a result, the arm can turn in a direction opposite to the direction in which it was turning, without modification of the turning direction of the motor that drives the drive gear. In the robot arm of the present embodiment, thus, the arm can turn away from an obstacle when the collision monitoring unit detects proximity of the arm to the obstacle. Collision against the obstacle can be avoided as a result.

The embodiments described above allow mitigating the influence of a collision between a robot arm and an obstacle.

The present invention allows cushioning quickly impact forces derived from collision or from collision avoidance, and can therefore be used in robot arms, robots and the like.

The invention claimed is:

1. A robot arm, comprising:
a drive gear having a shaft;
a gear frame configured to turn about the shaft of the drive gear;
a first follower gear configured to turn, in synchronization with the drive gear, about a shaft fixed to the gear frame, in a direction opposite to the turning direction of the drive gear;
a transmission control mechanism configured to lock the first follower gear to the drive gear;
an arm configured to move in synchronization with the first follower gear; and
a collision detection unit configured to detect a collision between the arm and an obstacle, wherein
the transmission control mechanism is configured to unlock the first follower gear from the drive gear in response to the detection, by the collision detection unit, of a collision between the arm and the obstacle, and wherein when the first follower gear is locked to the drive gear by the transmission control mechanism, the gear frame turns about the shaft of the drive gear, and when the unlocking is effected, the gear frame is locked so as not to turn about the shaft of the drive gear.

2. The robot arm according to claim 1, wherein the transmission control mechanism has a second follower gear configured to assume a lock position of locking or an unlock position of unlocking the first follower gear to/from the drive gear.

3. The robot arm according to claim 2, wherein when in the lock position, the second follower gear meshes with both the drive gear and the first follower gear, and when in the unlock position, the second follower gear meshes with either the drive gear or the first follower gear.

4. The robot arm according to claim 3, wherein in the transmission control mechanism, the second follower gear is configured to move between the lock position and the unlock position while meshing with at least the drive gear or the first follower gear.

5. A robot arm, comprising:
a drive gear that having a shaft;
a gear frame configured to turn about the shaft of the drive gear;
a first follower gear configured to turn, in synchronization with the drive gear, about a shaft fixed to the gear frame, in a direction opposite to the turning direction of the drive gear;
a transmission control mechanism configured to lock the first follower gear to the drive
an arm configured to move in synchronization with the first follower gear;
a collision detection unit configured to detect a collision between the arm and an obstacle; and
an outer ring gear having inner teeth and being fixed to the arm;
wherein the transmission control mechanism is configured to unlock the first follower gear from the drive gear in response to the detection, by the collision detection unit, of a collision between the arm and the obstacle, wherein the first follower gear is meshed with the drive gear,
wherein the first follower gear is a planetary gear configured to revolve around the drive gear while meshing with the inner teeth of the outer ring gear,
wherein the outer ring gear is configured to turn in phase with the first follower gear, and
wherein the transmission control mechanism comprises a clutch section having a movable section fixed to the first follower gear, and a fixed section fixed to the gear frame, and the transmission control mechanism is configured to lock the first follower gear to the drive gear by coupling the movable section with the fixed section, and when the collision detection unit detects a collision of the arm, the transmission control mechanism unlocks the first follower gear from the drive gear by separating the movable section from the fixed section.

* * * * *